United States Patent [19]

Franke et al.

[11] Patent Number: 4,598,854

[45] Date of Patent: Jul. 8, 1986

[54] APPARATUS FOR SEALING NON-CYLINDRICAL TANKS

[75] Inventors: Eric Franke, Glen Ellyn; Robert Kerber, Park Ridge; Marion D. Langley, Romeoville, all of Ill.

[73] Assignee: Briskin Manufacturing Company, Chicago, Ill.

[21] Appl. No.: 600,401

[22] Filed: Apr. 16, 1984

[51] Int. Cl.⁴ ............................................. B23K 37/04
[52] U.S. Cl. ...................................... 228/48; 228/184
[58] Field of Search ................... 228/48, 184; 269/61; 74/437, 30

[56] References Cited

U.S. PATENT DOCUMENTS

| | | | |
|---|---|---|---|
| 2,419,951 | 5/1947 | Kastel | 425/809 X |
| 2,758,367 | 8/1956 | Dougherty | 29/463 X |
| 3,726,462 | 4/1973 | Ronnkvist | 228/48 X |

Primary Examiner—Nicholas P. Godici
Assistant Examiner—Karen Skillman
Attorney, Agent, or Firm—David D. Kaufman

[57] ABSTRACT

A machine for automatically applying one or more bonding or sealing seams to the peripheral surface of a tank or vessel having a non-cylindrical cross section. More specifically the machine provides means for supporting and axially rotating a generally rectangular vessel having planar walls and connecting arcuate corners so that all of the peripheral surfaces of the vessel move under the sealing or bonding means at a constant rate of speed and at a fixed distance therefrom. The same is achieved by the use of gripper assemblies having a configuration corresponding to that of the vessel. Each gripper assembly includes a sprocket chain which corresponds to the configuration of the vessel. A sprocket wheel engages each chain to rotate the gripper assemblies and the vessel retained therebetween.

12 Claims, 5 Drawing Figures

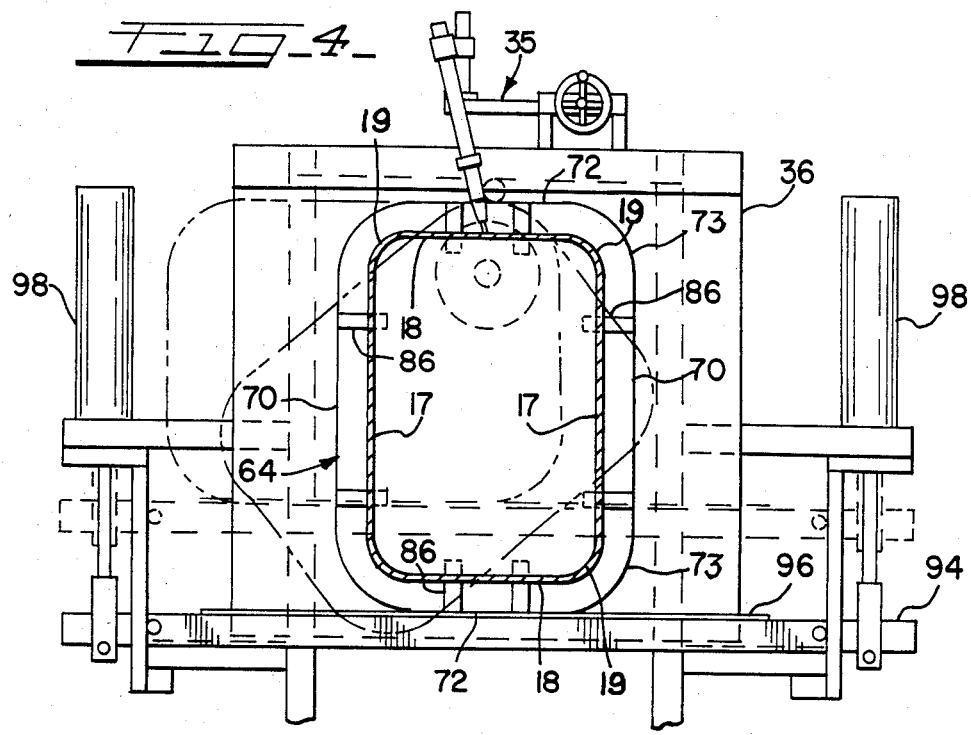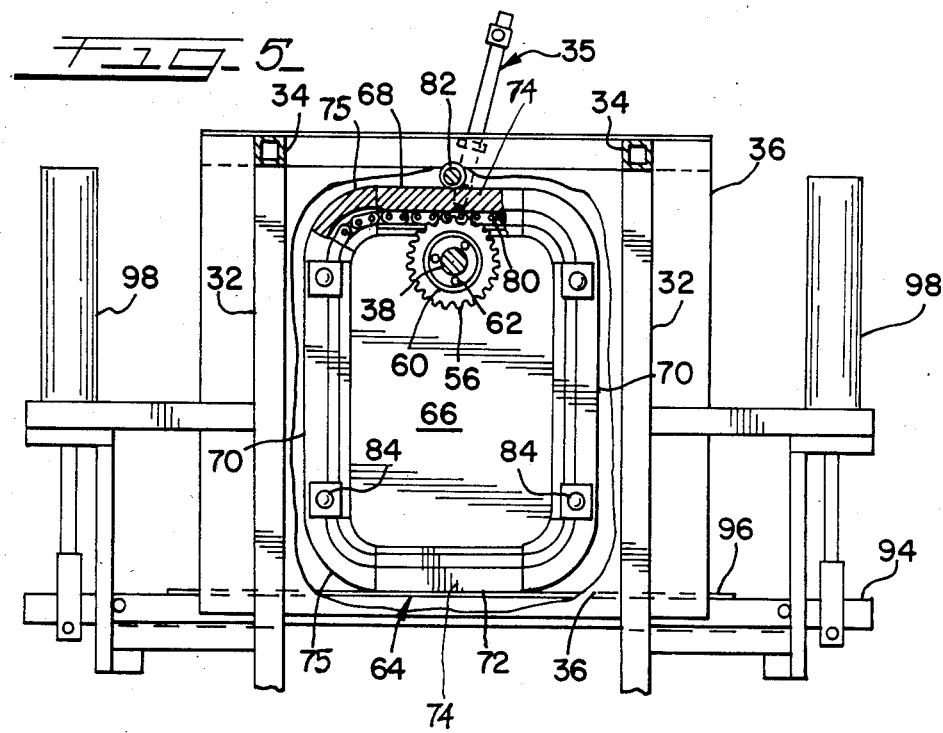

APPARATUS FOR SEALING NON-CYLINDRICAL TANKS

FIELD OF THE INVENTION

This invention relates to apparatus for automating the bonding or sealing operation, as by welding, soldering, gluing or the like, of the body and end closures of tanks or vessels of sheet metal or other suitable materials and, more particularly, to a machine for effecting the bonding or sealing operation of non-cylindrical or rectangular tanks.

BACKGROUND OF THE INVENTION

Tanks or vessels designed for the retention of fluids or liquids require fluid-tight seals and joints in order to be effective. Such tanks when of metal are found in a wide variety of applications such as, hot water heaters, water softener tanks, automotive fuel tanks, fuel storage tanks, autoclaves, and the like. The usual fluid storage vessel is circular in section and comprises a cylindrical body shell and circular end closures for the shell, the end closures being secured to the body by any conventional means, such as, welding or soldering, in the case of metal.

The use of skilled or semi-skilled manual labor to manually bond the end closures to the body of the vessel is undesirable for reasons of high labor costs and the uncertainty of the quality and consistency of the seal. In an attempt to eliminate the human element, efforts heretofore have been made to automate the bonding operation. For example, Pat. No. 2,517,853 teaches an apparatus wherein a cylindrical tank body is clamped into a frame, end closures are pressed into engagement by rotatably supported piston rods and the entire assembly is rotated about the longitudinal axis of the vessel as stationary welders automatically apply the weld seams. Pat. Nos. 2,753,826 and 2,758,367 teach somewhat simpler machines wherein cylindrical vessels are rotated by means of a stationary head stock member and a reciprocable tail stock member. Pat. No. 3,734,387 teaches a complex system including tracks, carriages and hydraulically operated frame members for positioning and rotating multiple cylindrical sections of large cylindrical storage tanks.

In each of the prior art examples mentioned the finished work product was a cylindrical vessel having a circular section and the workpiece was simply rotated about its longitudinal axis. Those devices were efficacious with cylindrical forms because the workpiece and seam to be applied moved at a constant speed and was always spaced a constant distance from the stationary welding tool. However, those skilled in the art will appreciate that the prior art devices would be ineffective with vessel structures having non-circular cross sections because of the varying speeds of rotation of the vessel surface and the spacing of the seam from the fixed welding tool.

It is, of course, well known that certain tanks are, by necessity or design, non-cylindrical in form. An example of such non-cylindrical tanks are automotive fuel tanks, and particularly the fuel tanks of highway truck tractors used for hauling trailers and the like. Typically, the fuel tanks of truck tractors are generally rectangular in section with curved or arcuate corners.

None of the known prior art devices is suitable for automated bonding or sealing methods of non-cylindrical tanks or tanks having planar surfaces and, more particularly, rectangular tanks having arcuate corners. There thus exists a need for apparatus that can rotate a tank of such form past a fixed point (viz., a welding or soldering tool, or the like) at a constant speed and with constant spacing from that point.

SUMMARY OF THE INVENTION

The present invention provides apparatus for co-axially gripping a non-cylindrical vessel or one having planar surfaces and, particularly, a vessel of substantially rectangular section with arcuate corners, and rotating the vessel so that the exterior surfaces thereof move past a fixed tool at a constant speed and constant spacing in relation to the tool. As a result, the fixed tool can consistently apply a perfectly uniform seal to the vessel.

In general, the inventive apparatus comprises a pair of opposed gripper assemblies including gripper plates, each of which is carried by a sprocket wheel. The gripper assemblies are generally rectangular and of geometrically similar configuration with the rectangular tank workpiece. Each of the assemblies has a sprocket chain embedded in the interior frame thereof adapted to cooperate with the associated sprocket wheel. The two sprocket wheels are mechanically linked so that driving of one wheel causes both assemblies to rotate in unison.

The sprocket wheels and gripper assemblies are carried by a pair of spaced structural frames, one of which is stationary and the other moveable for gripping and releasing a tank workpiece. Cam followers are associated with the gripper asemblies to insure positive action by the sprocket wheels and their associated sprocket chains.

The welding or other bonding tools are positionable as required to apply the pair of seams as the tank is rotated thereunder and suitable means is provided for automatically synchronizing their operation with movement of the tank. At any given time in the operation, the tank surface area to which the weld or seal is then being applied is in the most desirable horizontal orientation.

Means is provided below the workpiece for automatic support in the event the workpiece tank is of substantial weight. Automatic timer means is also provided for regulating the speed of rotation and synchronizing the various operations and said timer means can be related to the number of teeth on the sprocket wheels passing a given point.

As a result of the automated operation, a pair of uniform and substantially perfect seams is simultaneously applied to the rectangular tank with complete elimination of manual intervention. The same automated bonding or sealing may also be applied to tanks of other shapes by providing gripper plates of corresponding geometric configuration. Other features and advantages of the invention will be apparent from the following description and claims and are illustrated in the accompanying drawings which show structure embodying the preferred features of the present invention and the principles thereof.

BRIEF DESCRIPTION OF THE DRAWINGS

FIG. 4 is a vertical sectional view taken on the plane of line 4—4 in FIG. 1 and viewed in the direction indicated; and FIG. 5 is a similar view taken on the plane of line 5—5 in FIG. 1 and viewed in the direction indicated, with portions broken away to illustrate details of construction.

DETAILED DESCRIPTION OF THE INVENTION

Figure 1:
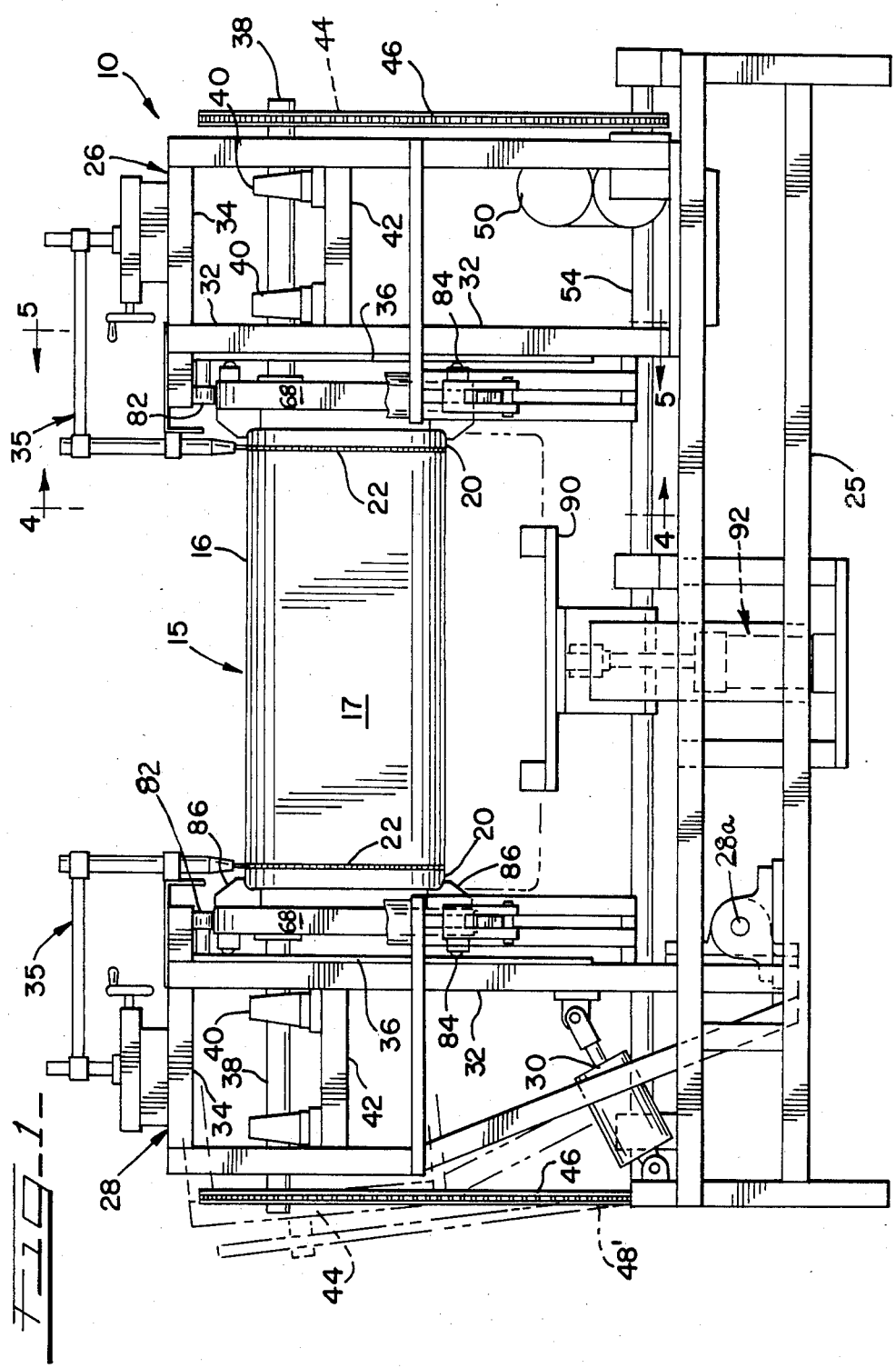
FIG. 1 is a front elevational view of a machine for automating the sealing of non-cylindrical vessels embodying the principles of the invention.

Referring now with greater particularity to the various Figures of the drawings, it will be seen that the reference numeral 10 indicates generally a machine for automating the bonding or sealing of non-cylindrical vessels embodying the principles of the invention. In the embodiment illustrated, the machine 10 is designed specifically for use with a rectangular vessel 15 of the type commonly employed as fuel tanks on truck tractors. As seen in FIGS. 1 and 4, vessel 15 comprises a central body section 16 having planar side walls 17, 17 and planar end walls 18, 18 interconnected by arcuate corners 19. Complementary end closures 20, 20 close the vessel 15 and are welded to the body section 16 with perimetral weld seams 22, 22 in the manner to be described.

The machine 10 comprises a base frame 25 carrying a stationary vertical support framework 26 and a moveable vertical support framework 28, said frameworks 26 and 28 being positioned in opposed complementary relationship. Vertical support framework 28 is pivotally mounted on the base 25 as at 28a and is moveable by a piston-cylinder assembly 30 between the operational vessel-gripping position shown in FIG. 1 and the open position indicated by the broken line showing for admitting or releasing a vessel 15. In other respects, the frameworks 26 and 28 are virtual mirror images of each other as will become apparent from the ensuing description. Accordingly, only framework 26 will be described herein in detail, it being understood that framework 28 comprises the same corresponding structure unless otherwise noted.

The framework 26 comprises vertical structural members 32, 32, horizontal structural members 34, 34 and a vertical mounting plate 36 carried by said structural members. An adjustable sealing tool, in the embodiment illustrated a welding apparatus 35, is mounted on the structural members 34 for positioning to apply the weld seam 22 as the vessel 15 passes thereunder.

A drive shaft 38 is rotatably supported in pillow block bushings 40, 40 which are mounted on a cross brace such as 42, said drive shaft extending through the mounting plate 36. A large sprocket wheel 44 is rigidly mounted on the outer end of the drive shaft 38 and is linked, by sprocket chain 46 to a motor-driven sprocket wheel 48, motor means 50 and an idler sprocket wheel 52.

The idler sprocket wheel 52 is rigidly mounted at one end of an elongated connector shaft 54. Connector shaft 54 carries at its opposite end a similar idler sprocket wheel 52 which is in turn linked by a chain 46 to a large sprocket wheel 44 and another idler sprocket wheel 48' which is the equivalent of the sprocket wheel 48, but without the motor means 50. It will thus be appreciated that operation of the motor and sprocket wheel 48 causes both large sprocket wheels 44 to rotate synchronously.

Rigidly mounted on the inner end of the drive shaft 38 is an actuator sprocket wheel 56. A pair of stress-relief or support collars 58 and 60 are likewise rigidly mounted on the inner end of the drive shaft, one on either side of the actuator sprocket wheel 56, and are connected together in tight engagement with said sprocket wheel by connector bolts 62 (see FIG. 3). The sprocket wheel 56 and support collars 58 and 60 thus comprise a unitary assembly rotatable by the drive shaft 38.

A gripper assembly 64 is carried by the actuator sprocket wheel 56. Gripper assembly 64 comprises a face plate 66 and a perimetral support frame 68 projecting from the back surface thereof. As seen in FIGS. 4 and 5 of the drawings, face plate 66 and support frame 68 are geometrically similar in configuration to the workpiece vessel 15, having sides 70, 70, ends 72, 72 and arcuate corners 73.

Figure 2:
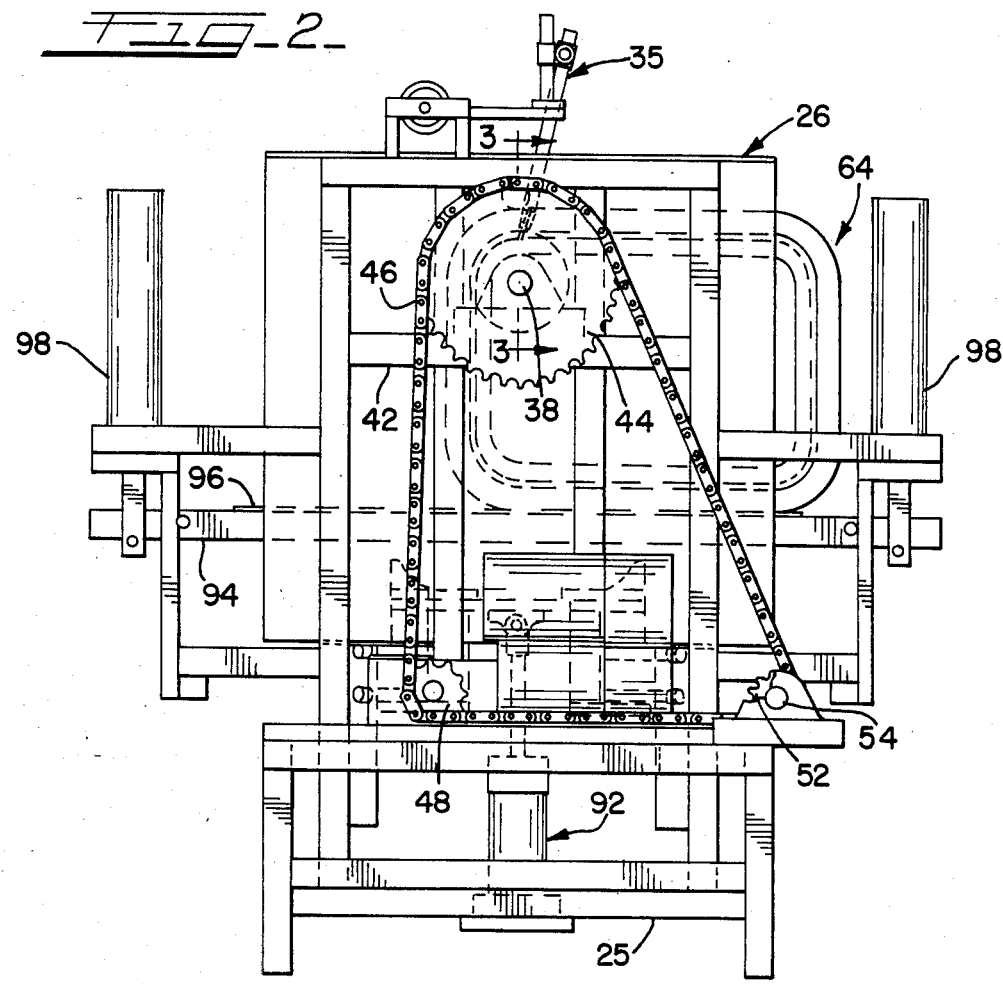
FIG. 2 is an end elevation viewed from the right side of FIG. 1.
Figure 3:
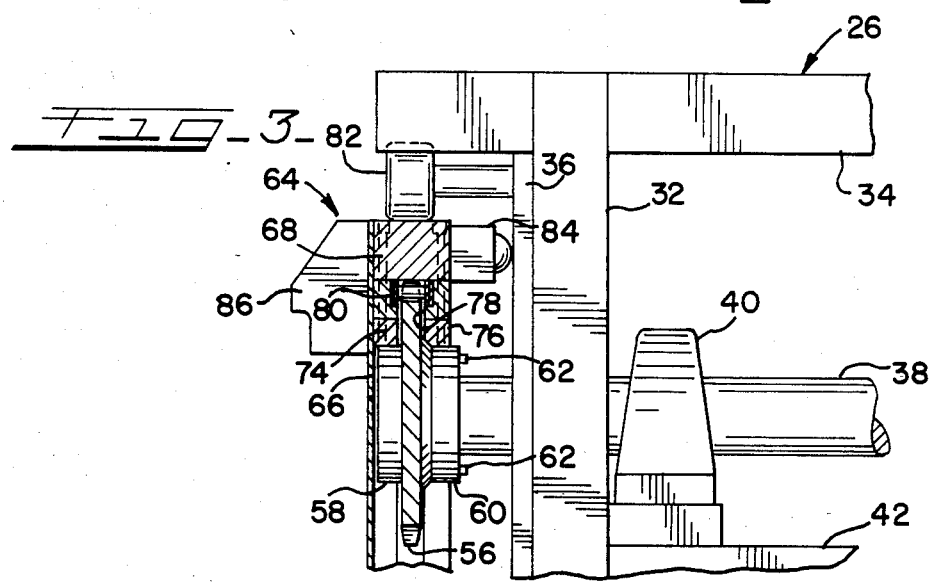
FIG. 3 is an enlarged sectional view taken on the plane of line 3—3 in FIG. 2 and viewed in the direction indicated.

Support frame 68 includes opposed straight elongated channel elements 74 and 76 extending along the sides 70 and ends 72 thereof (see FIG. 3). Connecting respective side and end elements are arcuate channel elements 75. The channel elements 74, 75 and 76 cooperate to provide a continuous T-shaped channel 78 adapted to rotatably receive therein the actuator sprocket wheel 56. As seen in FIG. 5, the channels in each of the arcuate corner elements 75 are somewhat larger in cross section than the channels of the straight sections so as to provide clearance for a purpose, as will hereinafter be explained. An endless sprocket chain 80 is embedded or retained within the notched channel 78 for engagement by the actuator sprocket wheel 56 and so that the channel elements 74 and 76 bear against the support collars 58 and 60. The sprocket chain 80 is clamped within the channel 78 in such manner that the portions of the chain lying within the straight sections of the channel are rigid while the portions of the chain lying in the arcuate clearance portions of the channel 78 remain flexible and are self adjustable to properly mesh with the sprocket wheel 56 so as to avoid binding. The gripper assembly 64 thus is effectively suspended from the actuator sprocket wheel 56 while the weight of said gripper assembly is borne substantially by support collars 58 and 60. It will thus be appreciated that the sprocket chain 80 constitutes an endless track having a configuration geometrically similar to the vessel 15, and that rotation of the actuator sprocket wheel 56 causes the gripper assembly 64 to describe the path of travel indicated in FIGS. 2 and 4 whereby the sides 70, ends 72 and corners 73 of the face plate 66 and frame 68 are always disposed at a fixed distance from the center of said sprocket wheel.

Means is likewise provided for positively insuring rotation and retention of the gripper assembly 64 in a vertical plane, said means comprising a roller cam follower 82 bearing against the outer edge of support frame 68 and a plurality of roller ball transfer members 84 projecting from the frame 68 and bearing against the mounting plate 36.

A plurality of gripper lugs 86 projects inwardly from the face plate 66 of the gripper assembly 64, and said lugs are arranged to accommodate therein an end of the specific workpiece illustrated, namely, the rectangular vessel 15. As seen in FIG. 4, the lugs 86 define an area and configuration identical to that of the vessel 15, whereby the vessel workpiece is concentrically retained on the assembly 64.

In the embodiment herein illustrated and described, the weight of the vessel 15 is such as to place substantial stress both on the moving parts of the machine and on the operator thereof. To alleviate such stresses, the machine is provided with a platform 90 operable by a piston-cylinder 92 for raising a vessel 15 into the operational welding position and/or lowering the same therefrom. A camming bar 94 having thereon a bronze wear plate 96 is likewise provided in association with each of the gripper assemblies 64 (see FIGS. 4 and 5). The camming bars 94 are moveable by pneumatic piston-cylinders such as 98 to automatically follow, and continuously bear upwardly against, the lowermost surface of the gripper assembly 64 as the same rotates through its substantially rectangular path.

Operation of machine 10 may now best be understood by referring to FIG. 1. With the support framework 28 in open position, a vessel 15 in which the body section 16 and end closures 20 have been previously pre-assembled, as by suitable spot welds, is placed on the platform 90. The operator then presses an electrical switch to activate an associated computerized control box (not shown) to institute the following fully automated operations. The platform 90 raises the vessel 15 into the operational workpiece position whereupon framework 28 is pivoted so that the vessel is gripped by the two gripper assemblies 64 and the platform 90 is retracted. Motor means 50 and the welders 35 begin to operate so that weld seams 22 are automatically applied as the vessel is rotated. Upward pressure by the camming bars 94 is continuously applied to the gripper assemblies 64 during the entire welding operation. When the seams 22 are complete around the entire perimeter of the vessel, the motor means and welders cease operation, the platform 90 is raised to support the completed vessel, and the framework 28 pivots outwardly to release the vessel to the platform for transfer to another work station.

In the embodiment shown and described, the various piston-cylinders are pneumatically operated, although hydraulic operation could obviously be employed if desired. Various forms of electrical controls may be employed for automation of the timing and sequencing of the operations, but in the subject embodiment the controls comprise microcomputerized circuitry which is related to the number of sprocket wheel teeth passing a given point. In this way, the actuator sprocket wheels 56 serve not only to support and rotate the gripper assemblies 64, but also to indirectly control the complete automation of the machine's operation.

Although the invention has been described in relation to rectangular vessels, it should be appeciated that the principles of the invention may likewise be employed with vessels of other shapes and vessels having planar surfaces and arcuate corners. In such cases, the gripper assemblies 64 would have a configuration geometrically similar to that of the particular vessel.

Also it will be understood that this invention is applicable to the bonding or sealing of vessels formed of non-metallic materials such as plastics, fiberglass and the like. In such cases sealing means, well known in the art, would be employed instead of conventional welding apparatus.

While a preferred embodiment has been illustrated and described herein, changes and variations may be made by those skilled in the art without departing from the spirit and scope of the appended claims. The invention is defined by the claims that follow.

What is claimed is:

1. A machine for rotating a vessel having a non-cylindrical cross-sectional form past a fixed point comprising:
   opposed co-axially rotatable gripper means for gripping the opposite ends of said vessel therebetween;
   an endless track carried on each of said gripper means and describing a path geometrically similar to the configuration of said vessel form;
   actuator means rotatable about a fixed axis for engaging and moving said track; and
   motor means for rotating said actuator means whereby the peripheral surfaces of said vessel pass said fixed point at a constant speed and a fixed distance from the axis of rotation of said acutator means,
   said gripper means comprising a pair of opposed gripper assemblies and means for moving one of said assemblies away from and toward the other for admitting and gripping a vessel therebetween,
   each of said gripper assemblies having a configuration geometrically similar to said vessel form, said track being secured to said assembly in concentric relationship therewith,
   said actuator means comprising a sprocket wheel associated with each of said tracks and said endless track comprising a cooperating sprocket chain,
   said gripper assembly being vertically suspended from said sprocket wheel with said chain in engagement with said sprocket wheel.

2. A machine according to claim 1, wherein said sprocket wheel is rigidly mounted on an actuator shaft, and comprising further a support collar mounted on said actuator shaft and rigidly connected to said sprocket wheel whereby said support collar bears the weight of said suspended gripper assembly.

3. A machine according to claim 2 wherein said sprocket wheels are mechanically linked whereby operation of said motor means causes said sprocket wheels to rotate synchronously.

4. A machine for automatically applying a peripheral seam to a vessel having a non-cylindrical cross-sectional form comprising:
   a pair of opposed substantially vertical gripper assemblies for gripping the opposite ends of said vessel therebetween,
   said gripper assemblies each having a configuration geomtrically similar to said vessel form;
   an endless track secured to each of said assemblies on one side thereof opposite to the gripped vessel,
   said track describing a path geometrically similar to said vessel form and being concentric with said assembly;
   actuator means associated with each of said assemblies for engaging and moving said track,
   said actuator means being rotatable about a fixed, substantially horizontal axis of rotation;
   a seam applying tool positioned at a fixed position vertically spaced above said axis of rotation;
   motor means for rotating said actuator means and assemblies synchronously whereby the peripheral surfaces of the vessel pass beneath said tool at a constant rate of speed and at a fixed distance therefrom while said tool applies a peripheral seam thereto; and a support frame projecting from said one side of each of said assemblies around the perimeter thereof, said endless track being embedded in said support frame, said endless track comprising a sprocket chain and said actuator means comprising a cooperating sprocket wheel, said assembly being suspended from the sprocket wheel so that the sprocket chain is in operational engagement therewith.

5. A machine according to claim 4 wherein said sprocket wheel is rigidly mounted on an actuator shaft, and comprising further a pair of support collars mounted on said actuator shaft and rigidly connected to said sprocket wheel whereby said support collars are engaged by said support frame and bear the weight of the suspended gripper assembly.

6. A machine according to claim 5 wherein said vessel is substantially rectangular in section, having planar sides and arcuate corners and said assemblies, support frames and sprocket chains having geometrically similar configurations.

7. A machine according to claim 6 and comprising further means for pivoting one of said assemblies away from and back toward the other of said assemblies for admitting and gripping said vessel therebetween.

8. A machine according to claim 7 and comprising further retractable means for automatically positioning said vessel for admission between and gripping by said gripper assemblies.

9. A machine according to claim 6 and comprising further a cam follower positioned above and bearing against said gripper assembly and support frame and rotatable about an axis in vertical alignment with said horizontal axis of rotation.

10. A machine according to claim 9 and comprising further a pressure wear bar associated with each of said gripper assemblies and means for automatically urging said bars upwardly against the traveling bottom surfaces of said gripper assemblies.

11. A machine for automatically welding a pair of end closures to a sheet metal vessel of rectangular section and having planar walls and arcuate corners comprising:

a pair of opposed gripper assemblies having a rectangular configuration geometrically similar to the vessel and adapted to grip the opposite ends of said vessel therebetween in axially aligned and concentric relationship;

means for automatically pivoting one of said assemblies away from and back toward the other of said assemblies for admitting or releasing said vessel;

means for automatically operationally positioning said vessel for admission between or removal from said assemblies;

a support frame secured to the outer face of each of said assemblies extending around the periphery thereof in said geometrically similar configuration;

an endless sprocket chain embedded in each of said support frames and defining a substantially vertical track having said geometrically similar configuration;

a sprocket wheel in engagement with each of said sprocket chains whereby said assembly is suspended therefrom;

a cam follower adapted to bear against the top surface of each of said assemblies and support frames and rotatable about an axis in vertical alignment with the axis of rotation of said sprocket wheels;

a pair of welding tools adapted to automatically apply a pair of weld seams around the periphery of said vessel; and drive means for rotating said sprocket wheels and assemblies synchronously so that the peripheral surfaces of said vessel pass beneath said welding tools at a constant speed and fixed distance therefrom.

12. A machine according to claim 11 wherein the operating tip of each of said welding tools is positioned substantially on the vertical plane defined by the centers of rotation of said cam followers and sprocket wheels.

* * * * *